3,034,419
COMBINATION COOKING UNIT
Earl D. Hillebrand and Herbert M. Reeves, Kankakee, Ill., assignors to Geo. D. Roper Corporation, Kankakee, Ill., a corporation of Massachusetts
Filed June 24, 1958, Ser. No. 744,183
5 Claims. (Cl. 99—340)

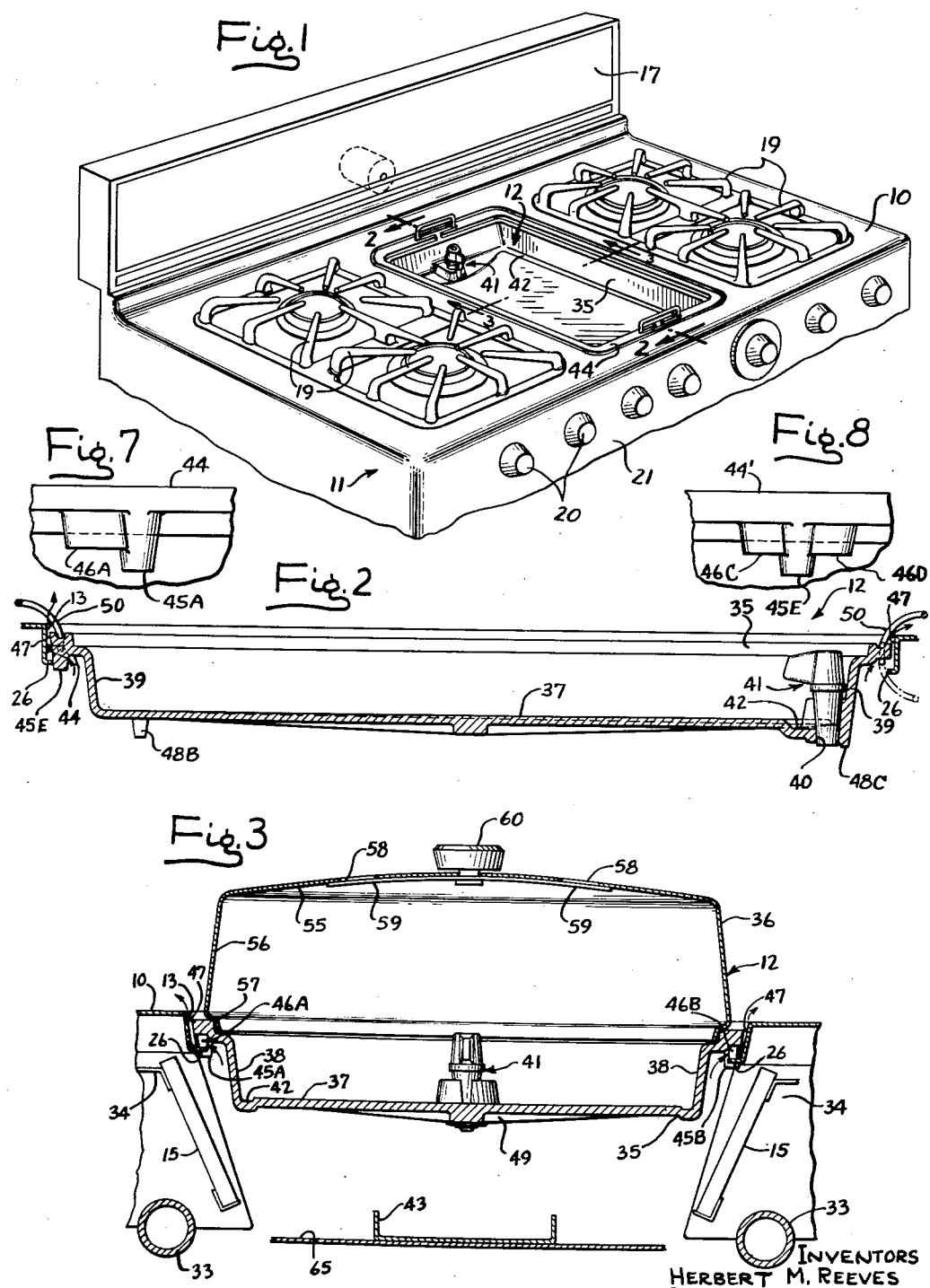

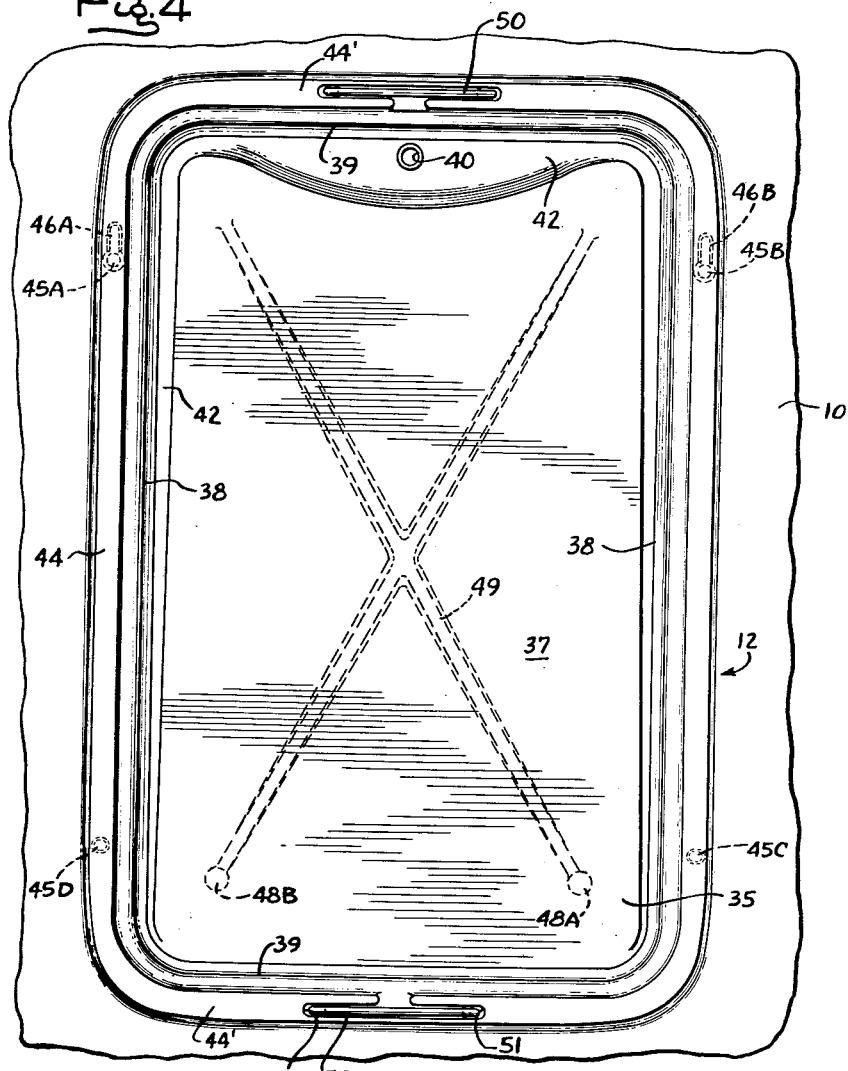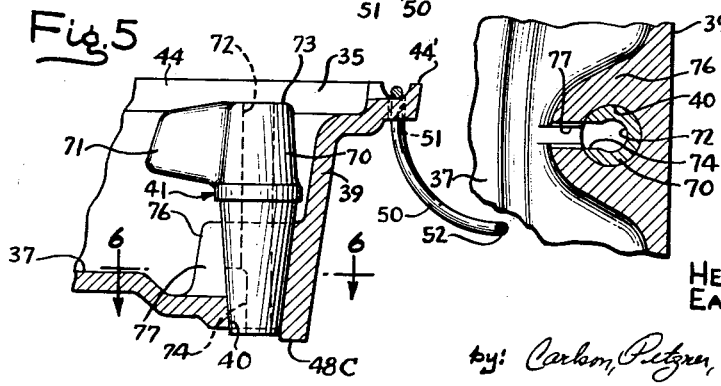

This invention relates to cooking appliances generally and more particularly to an improved combination cooking unit of the type adapted to be installed in the top of a cabinet, cook stove, or in a counter-top.

One object of the invention is to provide a multi-purpose cooking unit having a cooking vessel which finds use as a skillet, a griddle or a roaster, so that a wide variety of cooking operations may be performed with the unit.

Another object is to provide an improved vessel for use in such an appliance or cooking unit composed of a flat-bottomed, deep-walled skillet and removable cover, and wherein the skillet also has means for draining juices or fat without the necessity of removing the same from the cooking unit.

Another object is to provide a convenient means for draining melted fat, grease, and small food particles from such a skillet.

Another object is to provide a deep-walled skillet with means to maintain the skillet filled to a certain level with fat for deep fat frying, and also to provide an automatic overflow to prevent boil over.

Other objects and advantages of the invention will become apparent from the following description of the invention illustrated in the accompanying drawings in which:

FIGURE 1 is a perspective view of a cooking unit embodying the features of the invention shown as incorporated as part of a kitchen range;

FIG. 2 is a fragmentary longitudinal sectional view through the range top showing the skillet in section, and is taken in a plane substantially on the lines 2—2 of FIGURE 1;

FIG. 3 is a fragmentary transverse sectional view through the range top showing the skillet and cover in section, and is taken substantially in a plane of the lines 3—3 of FIGURE 1;

FIG. 4 is a fragmentary plan view of the range top with the cover removed, showing the skillet in place;

FIG. 5 is a fragmentary sectional view of the skillet showing the drain valve, and is taken substantially in the plane of lines 5—5 of FIG. 4;

FIG. 6 is a sectional view showing details of the drain valve, and is taken substantially in the plane of lines 6—6 of FIG. 5; and FIGS. 7 and 8 are fragmentary elevational views showing the bosses for supporting the skillet.

While the invention is susceptible of various modifications and alternative constructions, an illustrative embodiment has been shown in the drawings and will be described below in considerable detail. It should be understood, however, that there is no intention to limit the invention to the specific form disclosed, but, on the contrary, the intention is to cover all modifications, alternative constructions and equivalents falling within the spirit and scope of the invention as expressed in the appended claims.

Referring to the drawings, the invention has been shown as a cooking appliance or unit, mounted in the horizontal top panel 10 of a cook stove 11. The unit includes the vessel 12 carried within an opening 13 in the usual top panel 10, so as to be subject to heat provided by heating elements 15 mounted beneath the panel. Attention is invited to the fact that the unit might be made as a separate or independent appliance, and adapted for either fixed mounting or portable use, and supported in any convenient manner. In a preferred form the invention is shown as a cooking unit installed in the same manner as the cooking appliance for broiling disclosed in the co-pending application of Herbert M. Reeves, Serial No. 736,359, filed May 19, 1958, namely, in a gas range or cook stove. The cooking well provided in the top panel 10, including the radiant heating elements 15, is illustrated in the co-pending application referred to, and the improved vessel 12 is so dimensioned and arranged as to be received in the cooking well. Thus one aspect of the invention is to secure greater versatility of the range top unit disclosed in the application referred to, by permitting the unit to be used not only for broiling, but also for a variety of other cooking operations.

Accordingly, the unit is shown installed in the top panel 10 of the gas range or cook stove 11 which defines a flat, horizontal cooking top with an upright splash back 17 extending along its rear edge. This range happens to be equipped with four top burners arranged in pairs adjacent opposite ends of the top panel which is suitably apertured to accommodate the burners. The burners, which may be of any suitable type, are equipped with conventional utensil supporting grates 19. Gas is supplied to the burners through the usual manifold and piping under control of suitable valves operable by individual knobs 20 arranged on a control panel 21 at the front of the range.

The opening 13 (FIGS. 2 and 3) formed in the top panel 10, in this instance, is generally rectangular and is centered between the two pairs of burners. The marginal edge of the panel around the opening 13 is formed downwardly and inwardly to present a continuous horizontal ledge 26 offset downwardly from the top surface of the panel. This ledge provides support for the vessel 12 which hangs suspended therefrom between the radiant elements 15.

The radiant heating elements 15 which are mounted below the opposite long edges and adjacent the opening 13 in the panel 10 each comprise a generally elongated strip or plate of metal or other suitable material that does not deteriorate upon repeated heating to high temperatures. In the exemplary assembly the elements 15 comprise strips of perforated or expanded metal, such as stainless steel. While electrically heated elements may be employed if it is desired, those shown herein are arranged to be heated by gas burners 33 located below the elements at the side remote from the cooking unit.

Suitable housings 34 are provided for supporting the radiant heating elements 15 in position to direct radiant heat into a cooking zone substantially centered in the opening 13. More particularly, the elements 15 are supported in inclined position, the inclination being such that the radiant heat from the elements is directed inwardly and upwardly against the walls and bottom of the cooking vessel 12 suspended from the edges of the opening. The elements are thus positioned to deliver maximum heat to the vessel and food items received therein for cooking, and yet are removed from directly under the vessel.

In carrying out the invention, the radiant heating elements 15 under the cooking top and adjacent the opening, are utilized as sources of heat for heating the contents of the vessel 12. Further, in keeping with the invention, the vessel 12 is so provided that it may be used as a skillet either covered or uncovered for different cooking operations, as a griddle, or as a roasting pan.

Accordingly, the cooking vessel is composed of a deep walled pan or skillet 35, having a removable cover 36, and dimensioned to fit within the opening 13 in the cooking top 10. It has been found that a 2" deep skillet serves satisfactorily. The skillet 35 is generally rectangular in its preferred form so as to fit within the opening 13. It has a flat bottom 37, integral upright side walls 38, and end walls 39. As shown, the walls may slant slightly outwardly but are uniform height.

According to the invention, the skillet 35 is provided with a drain opening 40 at one end, having a drain valve 41 therein, and a continuous groove 42 extending substantially completely around the bottom at the base of the walls and leading to the drain opening, so as to enable fluid to be drained from the skillet into a grease pan 43 (FIG. 3) carried under the skillet, without removing the latter from the opening 13 in the panel 10.

The side and end walls of the skillet terminate in a continuous flat turned down flange 44 having a width some what greater than the corresponding dimension of the opening in the top panel 10 but small enough over all to fit within the depression formed by turning down the edges of the panel to define the ledges. More specifically, the flange 44 is dimensioned to overlie the ledge 26 and its under side is formed with depending bosses 45A—E substantially circular in form which are adapted to enter openings in the ledge 26 so as to locate the skillet 35 properly and hold the same against movement while in place in the opening. Laterally extending depending lugs 46A—D substantially shorter in height than the locating bosses 45A—E (as shown in FIGS. 7 and 8) and adapted to rest on the ledge 26 for supporting the skillet 35 when it is placed within the opening, are also formed on the under side of the flange 44 adjacent the circular bosses. The lugs 46A—D carry the skillet such that its flange 44 is positioned an appreciable distance above the ledge 26 so as to provide a clearance passage 47 for the flow of gasses from the burner compartment beneath the cooking top 10.

For supporting the skillet 35 on a flat counter-top or any flat surface, when the skillet has been removed from the opening 13 in the cooking top 10, the under side of the bottom 37 of the skillet is provided with depending lugs 48A—C providing a three-point support. Two of these lugs (48A, B) are formed adjacent the end of the skillet remote from the drain valve 41 and opening 40, and substantially at the points where an X-shaped rib 49 on the under side of the bottom of the skillet merges into the flat under surface of the bottom. A third point of support is provided by a lug 48C shown in FIG. 5 to be located adjacent the drain valve opening 40 and under the end wall 39 of the skillet substantially at its mid-point. The X-shaped rib 47 is provided to reinforce and thereby strengthen and lend rigidity to the flat bottom 37 so as to prevent warping or bending under heat particularly when the same is used as a griddle.

The exemplary skillet 35 has handles 50, in the end flanges 44' which afford a convenient means for carrying the skillet. Preferably, the handles 50 are made of wire bent into a U-shape and fastened by means of openings 51 in the end flanges, the legs of the U entering the openings and the wire ends 52 being bent at an angle to hold the handles in place. The handles 50 disappear neatly when the skillet is supported on any flat surface, as shown in FIG. 5. These handles 50 are curved, as seen from the side in FIGS. 2 and 5, so that the friction of the sliding fit in the openings 51 will hold them in the raised position (FIG. 2).

As will be seen by reference to the drawings, the removable cover 36 is formed with a slightly dished top 55 and outwardly tapering walls 56 and has an inwardly and downwardly turned flange 57 which fits neatly and sealingly within the inside edge of the flange 44 of the skillet 35. It is preferred that the cover 36 should have vents 58, appearing in FIG. 3, which may be regulated by a vent closure in the form of blades 59 large enough to cover the vents and angularly movable by means of a knob 60 so as to be adjustable to partially cover the vent openings. With the cover 36 in place on the skillet 35, the latter may be used for a variety of cooking operations requiring a cover which may be vented.

The improved vessel may be utilized for carrying out a variety of cooking operations in the preparation of different types of food. It is first noted that the skillet may be used for cooking either uncovered or covered. Uncovered the skillet may be used to heat food items, or for frying foods. The cover 36 may be used on the skillet to prevent loss of heat and moisture, as in the preparation of dishes which are required to cook or simmer at a low temperature for long periods. The cover also may simply be used as in frying to prevent spattering of the fat present in the skillet.

With the cover on the skillet, the vessel may be used as a roasting pan. A desirable result is achieved in this respect due to the relation between the heating elements 15 and the skillet 35 whereby the heat from the heating elements is directed against the outside of the walls as well as the under side of the bottom of the skillet. More uniform heating of the contents of the skillet is thus made possible. This is particularly important when the skillet and cover are used for roasting, although the feature is also important for other types of cooking.

In keeping with the invention, the skillet 35 may also be used as a griddle. The drain valve 41 located in the opening 40 provides means for draining juices, fat, particles of food, etc., from the skillet 35. In carrying out this aspect of the invention, the bottom surface 37 of the skillet 35 is provided with the continuous groove 42 which extends, in the form of the skillet illustrated, around three sides of the bottom and leads to the drain opening.

Referring to FIG. 4, the continuous groove 42 is seen to extend lengthwise of the skillet 35 from the end remote from the drain opening 40 along the opposite long edges at the base of the side walls 38, and turns the corners of the end adjacent the drain opening 40 extending continuously to a center point where the drain opening 40 is located. It is preferred that the sections of the groove 42 leading from the drain opening should have a bottom which slopes gradually upwardly so that the opening 40 is at the mutual low point and thus the grease, juices, drippings, or particles of food in the groove flow downwardly when the drain opening is unblocked by the drain valve to pass out the latter into the grease pan below.

Thus, with the valve 41 open, the fat from bacon or other fatty meat being cooked on the griddle will drain into the grease pan 43 placed below the valve, and the passage through the drain valve and the bottom of the skillet is of such size as to allow the passage of particles of food as well as grease or melted fat. The uncovered skillet 35 provides a serviceable griddle for cooking other food items such as pancakes or griddle cakes.

The grease or drip pan 43 may be supported by any convenient means such as a bracket (not shown) from the walls of the burner compartment, or may rest, as shown in FIG. 3, on the bottom surface 65 of the compartment. The surplus fat drained through the drain opening 40 to the grease pan 43 falls through a path lying vertically between the horizontally spaced heating elements 15 and will not splash or spill onto the heating elements either to affect their operation or to cause uncontrollable smoke or fire.

In keeping with the invention, the drain valve 41 preferably comprises, as shown in FIGS. 5 and 6, a hollow tapered plug 70, having a finger piece 71 extending laterally from the top of the plug so it may be conveniently turned by hand. The plug has an opening 72 through its center which extends throughout the length of the plug so as to provide access at the upper edge 73. A lateral opening or passage is provided by a notch 74 in the wall of the plug in the lower part of the same, as will be evident from FIGS. 5 and 6.

The opening 40 in the bottom of the skillet 35 is tapered similar to the plug 70, and extends through the bottom wall 37. A boss 76 projecting above the bottom of the skillet substantially surrounds the opening 40. To provide a passage for drain purposes, a vertical slot 77 is cut in the wall of the boss 76 and located so that the lateral passage through the plug 70 is adapted to register with the slot 77 to provide communication between the bottom of the skillet and the hollow center of the plug and thus through the opening 40 in the bottom of the skillet.

Further in keeping with the invention, the skillet is available as a frying pan not only for ordinary use but also for deep fat frying, and the hollow drain valve 41 provides an automatic overflow in the event of boil over of the fat in the skillet. This is achieved by locating the upper edge 73 of the hollow drain plug 70 just below the top of the walls 38, 39 of the skillet 35, as shown in FIG. 5, so as to prevent its contents, for example fat for deep fat frying, from boiling over the walls. Thus the skillet 35 may be filled with fat to a greater depth, and the level may be maintained just below the upper edge of the walls, without the danger of overflow.

Accordingly, the cooking appliance as hereinbefore specified, provides for carrying out a wide variety of cooking operations. The skillet when uncovered may be used as a conventional skillet for preparing different foods. As a covered vessel, in addition to further uses as a skillet, the vessel may be used as a roasting pan. The provision of a drain groove around the reinforced flat bottom, leading to a drain opening, allows the skillet to be used as a griddle. And the tall, hollow drain valve allows the skillet to be filled with fat, without the danger of boil over, and to be used for deep fat frying.

While the cooking unit may be made as a component of a standard kitchen range appliance, in this preferred form comprising a well formed in the flat cooking top with heating elements mounted in the preferred manner and the vessel including the skillet and cover, the unit may also be made as a completely separate cooking appliance. In this latter form the unit may either be made for fixed mounting or as a portable unit. In either type of installation, with the broiling rack disclosed in the co-pending application of Herbert M. Reeves, Serial No. 736,359, filed May 19, 1958, the unit is extremely versatile and provides a low cost cooking appliance adapted for either commercial or home use.

We claim as our invention:

1. In a combination cooking unit including a pair of radiant heating elements supported below and adjacent opposite edges of a generally rectangular opening in a horizontally disposed panel, a skillet dimensioned to fit within said opening and between said elements, said skillet having side and end walls extending upwardly to and resting on the panel, and a flat bottom suspended above the radiating elements such that the heat from the elements is directed against the walls and bottom of the skillet, a groove in said bottom of the skillet extending around the same at the base of certain of the walls, the bottom of the groove sloping toward an opening at the low point of the groove, a pan carried below the opening, and a drain valve in the opening operable to open and drain juice or fat from the skillet into the pan.

2. In a cooking unit having a horizontally disposed panel with an opening therein, the combination comprising, horizontally spaced sources of heat below and adjacent opposite edges of the opening in the panel and defining a cooking well, a deep walled vessel for receiving a food item, said vessel being dimensioned to fit within said opening and depend partially submerged in the well, said vessel having substantially vertical walls and a flat bottom, means carried by the panel for supporting the vessel so that heat from the sources is directed against the walls and the bottom of said vessel, a continuous groove extending around the bottom of the vessel at the base of the walls and having sections where the bottom of the groove slopes toward a mutual low point, means defining an opening at the low point of the groove, and a drain valve in the opening operable to open and drain juices or fat collected in the groove from the vessel, the horizontal spacing of the heat sources allowing draining in a vertical path therebetween.

3. In a cooking unit having a horizontally disposed panel with an opening therein, the combination comprising, spaced sources of heat below and adjacent the opposite edges of the opening in the panel and defining a cooking well, said sources being arranged to direct heat upwardly toward the opening and each other, a deep walled skillet for receiving a food item, said skillet being dimensioned to fit within said opening and depend partially submerged in the well, said skillet having substantially vertical walls and a flat bottom, means carried by the panel for supporting the skillet so that heat from the sources is directed against the walls and the bottom of said skillet, a groove in the bottom of the skillet extending substantially completely around the same at the base of the walls and having sections where the bottom of the groove slopes toward a mutual low point, means defining an opening at the low point of the groove, and a hollow drain valve in the opening operable to open and drain juices or fat collected in the groove from the skillet, the hollow drain valve having its upper edge below the top of the skillet walls to provide an overflow passage for liquid in the skillet, and a removable cover for the skillet carried by the walls thereof.

4. A cooking appliance comprising a substantially rectangular deep walled skillet having end and side walls of uniform height and a flat bottom, a removable cover for the skillet carried by the walls, a continuous groove in the bottom of the skillet extending around the same at the base of at least three of the walls and having sections where the bottom of the groove slopes toward a mutual low point, means defining a tapered drain opening in the bottom of the skillet at the low point of the groove including a boss raised above the bottom and having a lateral notch connected to the opening, and a hollow drain valve in the opening, said hollow drain valve comprising a hollow tapered plug dimensioned to fit rotatably in said tapered opening and having a lateral passage in the plug connected to the hollow center and adapted to register with the notch in the boss to unblock the drain and allow flow of juice or fat collected in the groove from the skillet.

5. A cooking appliance comprising a substantially rectangular deep walled skillet having substantially vertical end and side walls of uniform height and a flat bottom, a removable cover for the skillet carried by the skillet walls, selectively adjustable vents in the cover, a continuous groove in the bottom of the vessel extending around the same at the base of at least three of the walls and having sections where the bottom of the groove slopes toward a mutual low point, means defining a tapered drain opening in the bottom of the skillet at the low point of the groove including a boss raised above the bottom and having a lateral notch connected to the opening, and a hollow drain valve in the opening having its upper edge at a level below the top of the skillet walls to provide an overflow passage when the latter is filled with liquid for cooking, said hollow drain valve comprising a hollow tapered plug dimensioned to fit rotatably in said tapered opening and having a lateral slot in the plug connected to the hollow center and adapted to register with the notch in the boss to open the drain and allow flow of juice or fat collected in the groove from the skillet.

References Cited in the file of this patent

UNITED STATES PATENTS

| | | |
|---|---|---|
| 1,423,548 | Taylor | July 25, 1922 |
| 1,734,138 | Lehman | Nov. 5, 1929 |
| 2,298,780 | Wilson | Oct. 13, 1942 |
| 2,766,683 | Kanz | Oct. 16, 1956 |
| 2,848,894 | Pappas | Aug. 26, 1958 |
| 2,879,708 | Cripe | Mar. 31, 1959 |

FOREIGN PATENTS

| | | |
|---|---|---|
| 271,879 | Germany | Feb. 10, 1919 |